United States Patent
Ohashi

(10) Patent No.: US 9,621,623 B2
(45) Date of Patent: Apr. 11, 2017

(54) CLIENT, SERVER, MANAGEMENT SYSTEM, AND METHOD OF THE SAME

(71) Applicant: CANON KABUSHIKI KAISHA, Tokyo (JP)

(72) Inventor: Toshio Ohashi, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 14/166,187

(22) Filed: Jan. 28, 2014

(65) Prior Publication Data

US 2014/0214923 A1 Jul. 31, 2014

(30) Foreign Application Priority Data

Jan. 30, 2013 (JP) .................................. 2013-015872

(51) Int. Cl.
| | | |
|---|---|---|
| G06F 15/16 | (2006.01) | |
| H04L 29/08 | (2006.01) | |
| H04L 12/24 | (2006.01) | |
| H04L 12/26 | (2006.01) | |

(52) U.S. Cl.
CPC ............ H04L 67/02 (2013.01); *H04L 41/082* (2013.01); *H04L 43/065* (2013.01); *H04L 43/0817* (2013.01)

(58) Field of Classification Search
CPC . H04L 41/082; H04L 43/0817; H04L 43/065; H04L 67/02
USPC ........................................ 709/203, 217, 229
See application file for complete search history.

(56) References Cited

U.S. PATENT DOCUMENTS

| | | | | |
|---|---|---|---|---|
| 6,519,571 B1* | 2/2003 | Guheen | .................. | G06Q 30/02 705/14.66 |
| 7,124,101 B1* | 10/2006 | Mikurak | ................ | G06Q 10/06 705/35 |
| 7,165,041 B1* | 1/2007 | Guheen | .................. | G06Q 30/04 705/26.1 |
| 7,315,826 B1* | 1/2008 | Guheen | ............... | G06F 17/3089 703/27 |
| 2002/0165784 A1* | 11/2002 | Taggart | .................. | G06Q 30/02 705/26.43 |
| 2011/0112862 A1* | 5/2011 | Yu | ..................... | G06F 17/30867 705/3 |
| 2011/0112970 A1* | 5/2011 | Yu | ....................... | G06F 21/6254 705/51 |

FOREIGN PATENT DOCUMENTS

| | | |
|---|---|---|
| JP | 2007-519071 A | 7/2007 |
| JP | 2009-146352 A | 7/2009 |

* cited by examiner

*Primary Examiner* — Kristie Shingles
(74) *Attorney, Agent, or Firm* — Canon USA, Inc. IP Division

(57) ABSTRACT

A client includes a registration unit that registers operation control information received from a server and corresponding to a service provided by the server, a calling unit that calls the service in order to cause the server to execute the service when a user selects the service corresponding to the operation control information registered by the user, and an execution unit that, when the user selects the service corresponding to the operation control information registered by the user, executes processing to be executed by the client indicated by the operation control information corresponding to the service, in calling of the service.

24 Claims, 10 Drawing Sheets

FIG.3

SERVICE MANAGEMENT TABLE 300

| Service ID | Service Name |
|---|---|
| 1 | FIRMWARE PROVIDING SERVICE |
| 2 | REPORTING SERVICE |

OPERATION CONTROL INFORMATION MANAGEMENT TABLE 301

| Service ID | Action | Type | Href | disposition |
|---|---|---|---|---|
| 1 | DISTRIBUTE_FIRMWARE | text/xml | firmware.html | window\|inline |
| 2 | REPORTING | text/xml | reporting.html | window\|inline |

CLIENT PROCESSING INFORMATION MANAGEMENT TABLE 302

| Service ID | File | Class | Method | ExecuteAt | AutoDownload | DeviceType |
|---|---|---|---|---|---|---|
| 1 | mymodule.dll | myclass | getDeviceInfo | before | True | Private |
| 1 | mymodule.dll | myclass | enableFirmwareUpdateMode | before | True | Private |
| 1 | mymodule.dll | myclass | distributeFirmwareAndRestart | after | True | Private |
| 2 | mymodule.dll | myclass | getDeviceInfoDetailForPrivate | before | False | Private |
| 2 | mymodule.dll | myclass | getDeviceInfoDetailForStandard | before | False | Standard |

FIRMWARE MANAGEMENT TABLE 303

| Firmware ID | Product ID | Firmware Version | File |
|---|---|---|---|
| 1 | 1 | 10.11 | model1_fw_10.11.zip |
| 2 | 2 | 2.48 | mode2_fw_2.48.zip |

REPORT MANAGEMENT TABLE 304

| Report ID | File | CreatedOn |
|---|---|---|
| 1 | report1.pdf | 2012/12/1 17:00 |
| 2 | report2.pdf | 2012/12/1 18:00 |

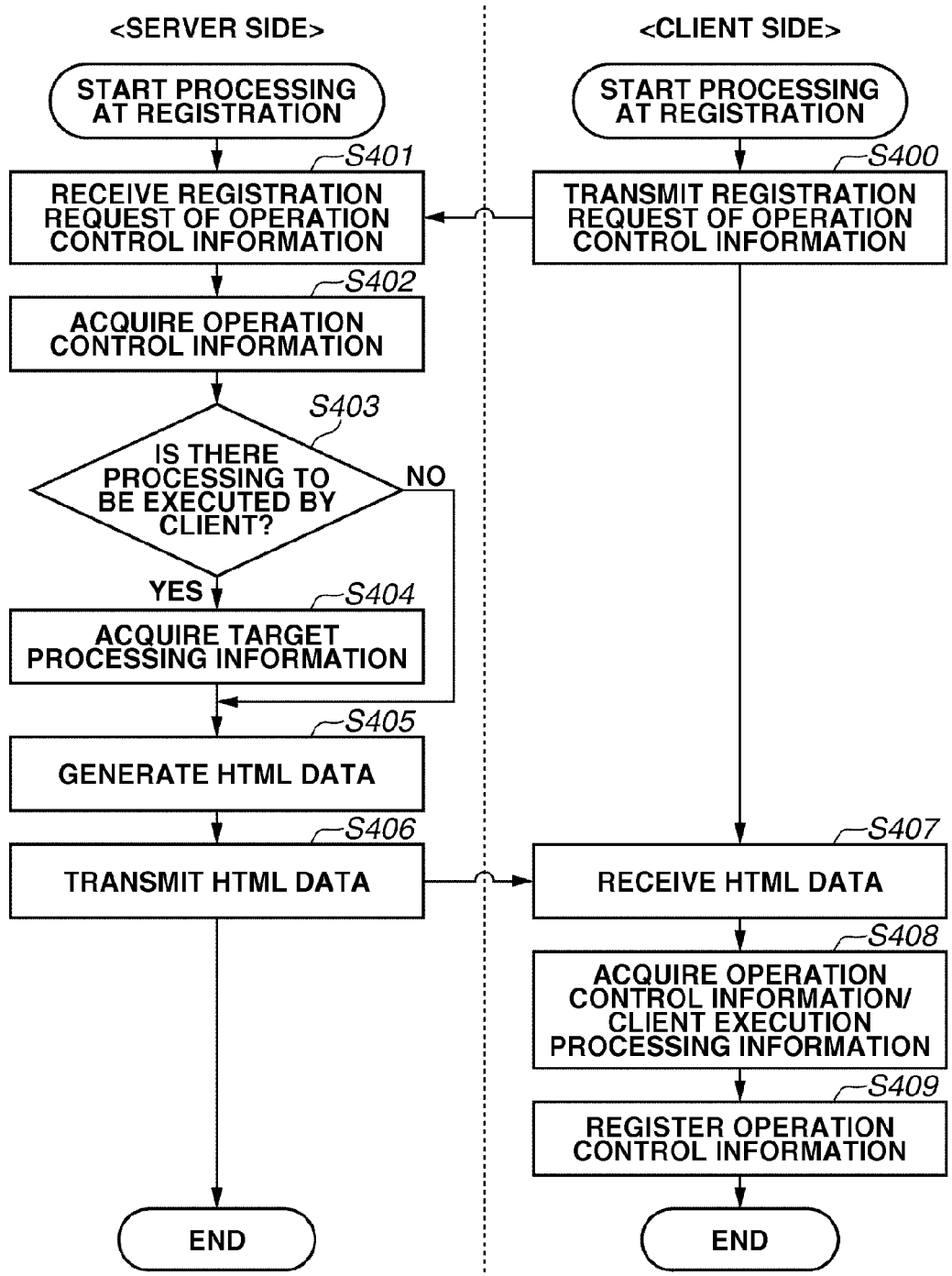

```
<intent
 action="http://<myserver>/DISTRIBUTE_FIRMWARE"
 type="text/xml"
 disposition="window|inline"
/>
```
— 501

```
<intentClientProcess
 file="mymodule.dll"
 class="myclass"
 method="getDeviceInfo"
 executeat="before"
 autodownload="true"
/>
```
— 502

```
<intentClientProcess
 file="mymodule.dll"
 class="myclass"
 method="enableFirmwareUpdateMode"
 executeat="before"
 autodownload="true"
/>
```
— 503

```
<intentClientProcess
 file="mymodule.dll"
 class="myclass"
 method="distributeFirmwareAndRestart"
 executeat="after"
 autodownload="true"
/>
```
— 504

510

```
<intent
 action="http://<myserver>/REPORTING"
 type="text/xml"
 disposition="window|inline"
/>
```
— 511

```
<intentClientProcess
 file="mymodule.dll"
 class="myclass"
 method="getDeviceInfoDetailForPrivate"
 executeat="before"
 autodownload="false"
 devicetype="private"
/>
```
— 512

```
<intentClientProcess
 file="mymodule.dll"
 class="myclass"
 method="getDeviceInfoDetailForStandard"
 executeat="before"
 autodownload="false"
 devicetype="standard"
/>
```
— 513

FIG.7A

SELECT PRINTER MANAGEMENT SERVICE

COMPANY A
MPS REPORTING SERVICE
(CORRESPONDING MODELS ARE PRINTERS OF COMPANIES A, B, AND C)

COMPANY B
MPS REPORTING SERVICE
(ONLY MODELS CORRESPONDING TO COMPANY B)

COMPANY C
MPS REPORTING SERVICE
(SINCE THERE IS OTHER COMPANY'S DEVICE, REPORT WILL BE GENERATED AFTER COMPLETION OF INSTALLATION OF NECESSARY MODULE AND COLLECTION OF INFORMATION OF PRINTER.)

FIG.7B

SELECT PRINTER [NEXT]

☑ COMPANY B XX-XX
IP Address : 172.24.xx.xx

☐ COMPANY B XX-XX
IP Address : 172.24.xx.xx

☑ COMPANY C XX-XX
IP Address : 172.24.xx.xx

☑ COMPANY C XX-XX
IP Address : 172.24.xx.xx

☐ COMPANY D XX-XX
IP Address : 172.24.xx.xx

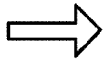

SELECT PRINTER MANAGEMENT SERVICE [CONFIRMED]

☑ COMPANY B
MPS FIRMWARE DISTRIBUTION SERVICE
(ONLY MODELS CORRESPONDING TO COMPANY B)

☑ COMPANY C
MPS FIRMWARE DISTRIBUTION SERVICE
(ONLY MODELS CORRESPONDING TO COMPANY C)

▨ COMPANY D
MPS FIRMWARE DISTRIBUTION SERVICE
(ONLY MODELS CORRESPONDING TO COMPANY D)

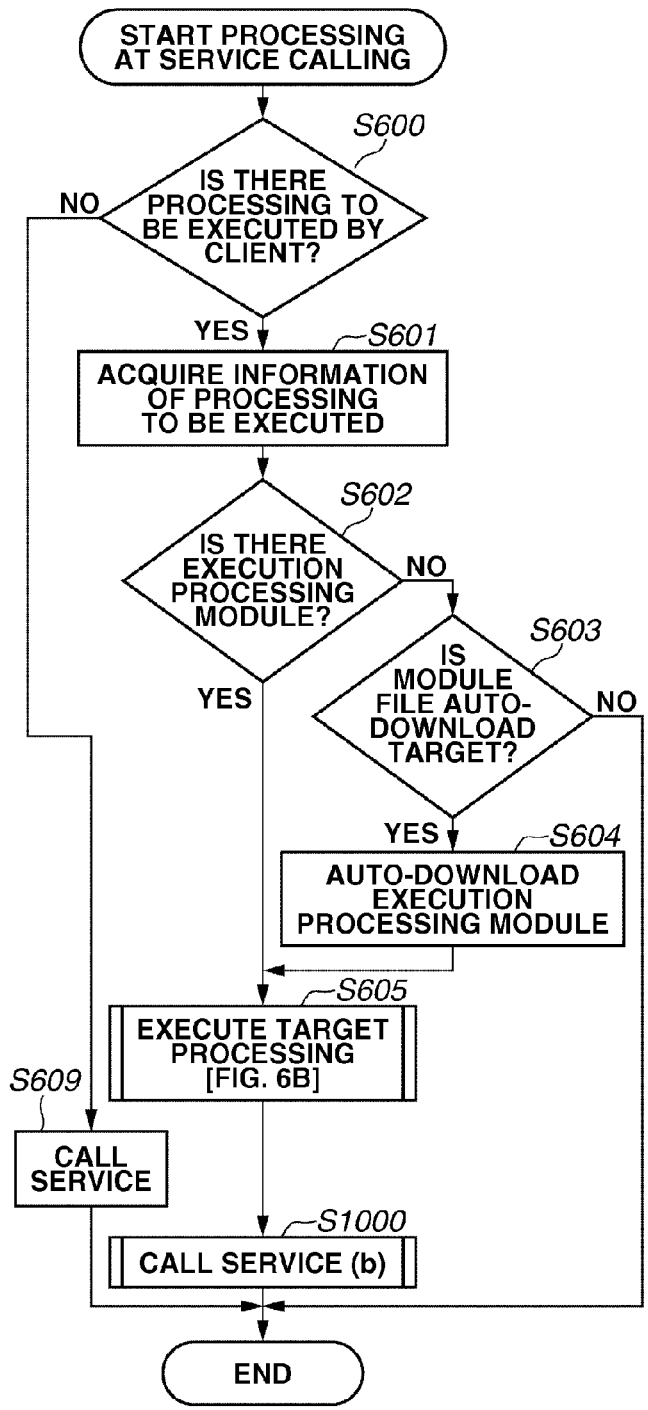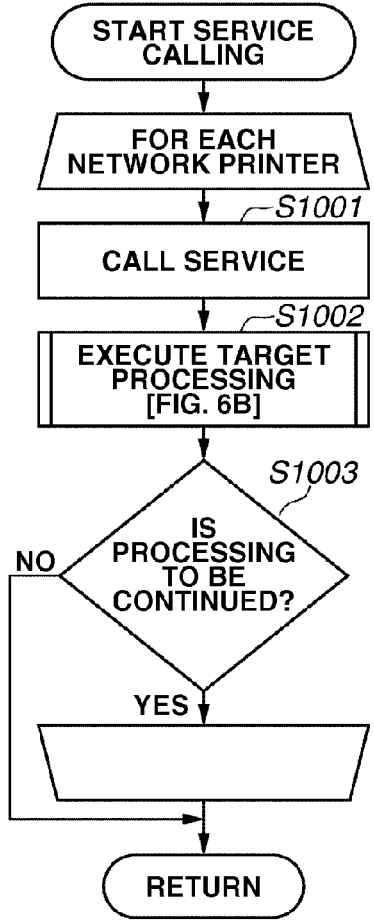

CLIENT, SERVER, MANAGEMENT SYSTEM, AND METHOD OF THE SAME

BACKGROUND

Technical Field

The present disclosure relates to a technology for using a service provided by a device on a network.

Description of the Related Art

Currently, mechanisms are provided, in which a client cooperates with an arbitrary web application without using application programming interfaces (APIs) dedicated to web applications (services) provided by various web servers. For example, there is a method for loosely coupling an application of the client and a web application by late binding at runtime.

First, at a timing when a user requests a client application to conduct a specific operation, the client application makes a list of web applications registered in the client application in advance as handlers for specific operations, and prompts the user to select a web application. Next, the client application passes execution data described in a predetermined format to the web application selected by the user, so that the client application transfers execution liability of a general operation. With the above processing, cooperation between the client application and the web application by late binding at runtime is realized. For example, a technology called web intents employs this method.

Further, as a method for making processing of a client application and of a web application to seamlessly cooperate with each other, a method has been discussed, in which an application having operated as a web application is installed to the client application. (For example, see Japanese Unexamined Patent Application Publication (translation of PCT Application) No. 2007-519071.)

It may be desirable to perform service-dependent pre/post processing on the client side before/after execution of a service, depending on the service provided by a web application.

For example, assume a case in which a web application provides a report output service that reports operation status of a plurality of network devices managed by the client. In this case, if a client-side module can obtain desired information from the network devices at execution (immediately before the execution) of the service before calling the report output service, the client can input information for highly accurate reporting to the web application.

Further, assume a case in which a web application provides a firmware management service that distributes firmware for a plurality of network devices managed by the client. In this case, if a client-side module can obtain current firmware information from the network devices at execution (immediately before the execution) of a service before calling the firmware management service, the web application can provide more appropriate firmware to the network devices or to the client. When firmware is provided to the client after calling of the firmware management service, it is necessary for the client-side module to distribute the firmware to the network devices as post-processing.

The technology provided in the description of the related art does not assume execution of pre/post processing linked with the service when calling such a service provided by a web application.

SUMMARY

An aspect of the present invention is directed to a technique for flexibly performing, on a client side, a cooperation operation corresponding to a service provided by a called web application or the like.

A client configured to perform communication with a server according to the present invention includes a request unit configured to access a service provided by the server and to request operation control information corresponding to the service, a registration unit configured to execute registration processing of the operation control information received from the server according to the request, a calling unit configured to call the service in order to cause the server to execute the service according to selection of the service corresponding to the operation control information registered by a user, and an execution unit configured to execute processing to be executed by the client based on the operation control information, in calling of the service, in order to pass to the server information to be required for the service to be called according to the selection by the user.

Further features and aspects of the present invention will become apparent from the following detailed description of exemplary embodiments with reference to the attached drawings.

BRIEF DESCRIPTION OF THE DRAWINGS

FIG. 3 is a diagram illustrating a database configuration.

FIG. 4 is a diagram illustrating a flowchart for describing processing of a server/client at operation control information registration in a first exemplary embodiment.

FIG. 5 is an example of hypertext markup language (HTML) data in the first exemplary embodiment.

FIGS. 7A and 7B are examples of a service selection screen in the first exemplary embodiment.

FIGS. 10A and 10B are diagrams illustrating flowcharts for describing processing of the client at calling a service in the second exemplary embodiment.

DESCRIPTION OF THE EMBODIMENTS

Various exemplary embodiments, features, and aspects of the invention will be described in detail below with reference to the drawings.

An exemplary embodiment of a management system according to the present invention will be described. Note that, here, web intents will be exemplarily described as an example of a mechanism of control in which an application that operates on a client is in cooperation with a web application that operates on a server using operation control information. Apparently, a mechanism other than web intents may be employed as long as the mechanism similarly performs control using operation control information.

Further, a firmware management service and a reporting service of print use status to a plurality of network printers will be exemplarily described as an example of a web application that operates on the server. Alternatively, the present invention is applicable to web services such as an application distribution service, a resource distribution service, and an address book distribution service to a plurality of network printers as similar management services of a network device. Further, the present invention is also applicable to a case in which a client side collects device information and status information of network printers when calling a print service provided by a web application.

Figure 1:
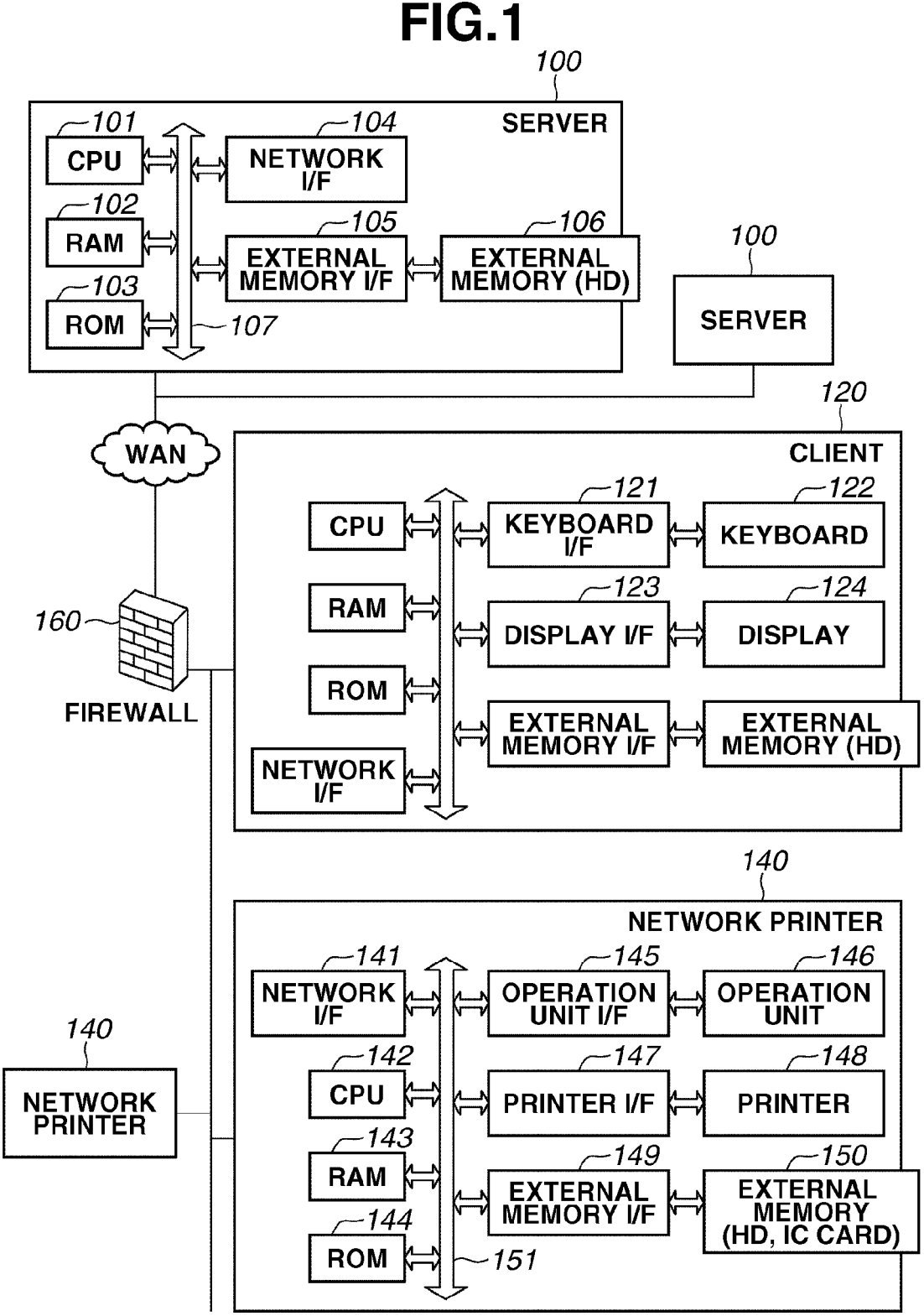
FIG. 1 is a diagram illustrating a system configuration and a hardware configuration.

FIG. 1 is a block diagram describing a system configuration and a hardware configuration of a management system including a client and a server of the present exemplary embodiment.

The management system includes a client 120 connected by a local area network (LAN) and one or more servers 100 connected through a wide area network (WAN) over a firewall 160. Further, one or more network printers 140 connected by a LAN exist as network devices managed by the client 120. Note that the server 100 and the client 120 have a configuration of a general-use computer. Regarding things in the hardware configurations that overlap with each other between the server 100 and the client 120, only one of them will be described and description of the other will be omitted.

In the present exemplary embodiment, web applications, which are different from each other, are assumed to operate in the plurality of servers. The client can call a service provided by a web application of any server by a similar operation using a browser application that operates on the client, for example. Further, each web application of the plurality of servers may provide the same type of services. That is, a user of the client can appropriately select and call a service in consideration of the content of each service. Therefore, in the present invention, the user can call and execute a web service provided on the Internet, called a cloud service, which has been increasing in recent years, without paying attention to a vendor who is a provider of the web service.

Further, one server may be configured as a system including a plurality of devices, and the plurality of devices may be in cooperation with each other to provide the client with a service by a web application.

In the server 100, a central processing unit (CPU) 101 executes processing based on an application program and the like stored in a read-only memory (ROM) 103 or in an external memory 106. Further, the CPU 101 comprehensively controls devices connected to a system bus 107. A random-access memory (RAM) 102 functions as a main memory and a work area of the CPU 101. The ROM 103 is a read-only memory that functions as a storage area of a basic input/output (I/O) program, and the like. The ROM 103 or the external memory 106 stores an operating system program (hereinafter, OS) that is a control program of the CPU 101. Further, the ROM 103 or the external memory 106 stores a file and other various types of data to be used in processing based on the application program. A network interface (I/F) 104 is connected to a network and performs network communication. An external memory I/F 105 controls an access to/from the external memory 106 such as a hard disc (HD). The external memory 106 stores a boot program, various applications, a user file, an editing file. The server 100 operates in a state in which the CPU 101 is executing the basic I/O program and the OS written in the ROM 103 or the external memory 106. The basic I/O program is written in the ROM 103, and the OS is written in the ROM 103 or the external memory 106. When the user turns ON an electric power source of a computer, the OS is written in the RAM 102 from the ROM 103 or the external memory 106 by an initial program loading function in the basic I/O program, and the operation of the OS starts. The system bus 107 connects the devices.

In the client 120, a key board I/F 121 controls inputs from a keyboard 122 and a pointing device (not illustrated). A display I/F 123 controls display of a display 124. The CPU 101 opens various windows registered based on commands instructed with a mouse cursor and the like (not illustrated) on the display 124, and executes various types of data processing.

In the network printer 140, a network I/F 141 is connected to a network and performs network communication. A CPU 142 outputs an image signal as output information to a printer 148 through a printer I/F 147 connected to a system bus 151, based on a control program and the like. Note that the control program is stored in a ROM 144, an external memory 150, or the like. The CPU 142 is capable of performing communication processing with a computer through the network I/F 141, and is capable of notifying the client 120 of information in the network printer 140 and the like. Further, the CPU 142 executes processing based on an application program and the like stored in the ROM 144 or the external memory 150. A RAM 143 functions as a main memory and a work area of the CPU 142, and is capable of expanding a memory capacity with an optional RAM connected to an expansion port. Note that the RAM 143 is used as an output information rasterization region, an environment data storage region, and a non-volatile RAM (NVRAM). A ROM 144 is a ROM and the external memory 150 is an external memory such as a hard disk (HD). The ROM 144 or the external memory 150 stores control program of the CPU 142, font data to be used when the output information is generated, and information to be used on the network printer 140. An operation unit I/F 145 serves as an interface between the network printer 140 and an operation unit 146, and outputs to the operation unit 146 image data to be displayed. In addition, the operation unit I/F 145 receives information input by the user through the operation unit 146. The operation unit 146 corresponds to an operation panel and the like on which a switch and a light-emitting diode (LED) indicator for an operation are arranged. The printer I/F 147 outputs an image signal as output information to the printer 148 (printer engine). An external memory I/F (memory controller) 149 controls an access to/from the external memory 150, such as a hard disk (HD) or an integrated circuit (IC) card. Note that the above-described external memory is not limited to one, and the network printer 140 includes at least one external memory and may be able to be connected to a plurality of external memories that stores an optional font card in addition to a built-in font and a program that interprets a printer control language in a different language system. Further, the network printer 140 may include an NVRAM (not illustrated) and store printer mode setting information from the operation unit 146. The system bus 151 connects devices.

With regard to the above-described hardware configuration, each device may include a plurality of similar hardware devices. For example, the server 100 may include a plurality of CPUs.

Figure 2:
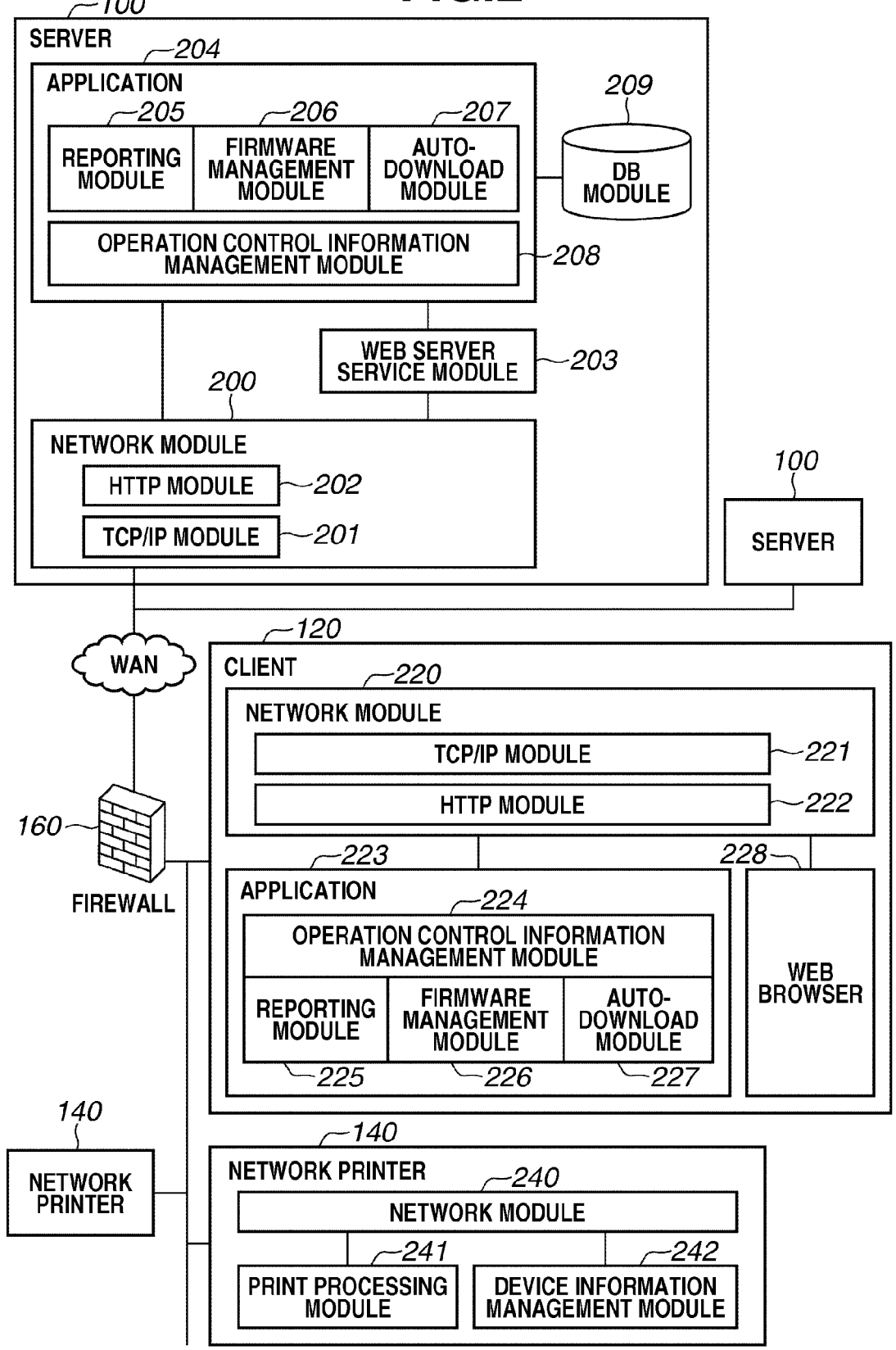
FIG. 2 is a diagram illustrating a software configuration.

FIG. 2 is a block diagram describing a software configuration of the management system in the exemplary embodiment.

First, a software configuration of the server 100 will be illustrated. In the server 100, an application 204 and modules exist as files stored in the external memory 106. The application 204 and the modules are program modules loaded into the RAM 102 and executed by the OS or by a module that uses the modules at execution. In addition, the application 204 can be added to a compact disc read-only memory (CD-ROM, not illustrated) of the external memory 106 or to an HD of the external memory 106 through a network.

A network module 200 performs network communication with a computer. The network module 200 includes a transmission control protocol/internet protocol (TCP/IP) module 201 and a hypertext transport protocol (HTTP) module 202. The TCP/IP module 201 performs network communication by the TCP/IP protocol. The HTTP module 202 uses a TCP as a transport protocol and performs network communication by the HTTP protocol. A web server service module 203 provides a service responding an HTTP response upon receiving an HTTP request from the client 120. The application 204 manages the network printer 140 through the client 120 by issuing an instruction to the client 120. The application 204 is mounted as a program that executes processing in response to an HTTP request, for example.

As described above, the application 204 realizes a web application that provides a service for managing the client 120 and the network printer 140 together with the web server service module 203.

A reporting module 205 receives information of the network printer 140 collected by a reporting module 225 of an application 223 that operates on the client 120. The information of the network printer 140 received by the reporting module 205 includes device configuration information and print history information of the network printer, for example. The reporting module 205 generates a use status report that indicates a use status of the network printer 140 by a table or a graph based on the received information of the network printer 140. The generated report is stored in a database server service module (DB module) 209. Then, when having received a report display request through a web browser 228 that operates on the client 120, the application 204 requests the reporting module 205 to perform report acquisition processing. The reporting module 205 that has received the report acquisition request acquires the use status report stored in the DB module 209. The use status report of the network printer 140 generated by the reporting module 205 is displayed on a user interface (UI) of the web browser 228 that operates on the client 120. The use status report may be able to be downloaded in an arbitrary format file such as a comma separated value (CSV) format or a portable document format (PDF).

A firmware management module 206 stores firmware for network printer 140 in the DB module 209. The firmware management module 206 receives a firmware acquisition request from a firmware management module 226 of the application 223 that operates on the client 120 described above. When having received the firmware acquisition request, the firmware management module 206 acquires the firmware for network printer 140 from the DB module 209. The firmware management module 206 returns the acquired firmware to the firmware management module 226 of the application 223 that operates on the client 120 and is a requestor.

An AutoDownload module 207 returns, in response to a request from an AutoDownload module 227 of the application 223 that operates on the client 120, a requested module file. For example, the AutoDownload module 227 acquires a module file from the DB module 209. The AutoDownload module 207 may return access information (uniform resource locator (URL) information) of another database server that can download the requested module file. In this case, the AutoDownload module 227 that operates on the client 120 acquires an appropriate module file using the access information.

An operation control information management module 208 performs overall control about operation control information. The operation control information management module 208 generates and returns HTML data including tag information for registration of operation control information in response to a request from an operation control information management module 224 of the application 223 that operates on the client 120.

The DB module 209 manages data, and stores and takes out data according to a request from other modules. The DB module 209 may be in a separate device from the server 100 as long as the module can be accessed from the application 204.

FIG. 3 illustrates an example of a table configuration in the DB module 209. Note that the table configuration of FIG. 3 is an example, and any table configuration different from this example may be employed as long as the table stores similar information.

A service management table 300 is a table that manages information about a service provided by the application 204. The information managed by the service management table 300 is, for example, a service identification (ID), and a service name. Here, the service ID is an ID uniquely identifying a service, and the service name indicates a name of the service.

An operation control information management table 301 is a table that manages the operation control information of a service provided by the application 204. The information managed by the operation control information management table 301 is, for example, Service ID, Action, Type, Href, and Disposition. Here, the Service ID is an ID uniquely identifying a service, the Action is information indicating an operation executable by the service, and the Type is filter information associated with the Action. The Href is information indicating a page loaded at selection of a service, and the Disposition indicates a method for opening a page of the service.

A client processing information management table 302 is a table that manages information about processing that needs to be executed on the client side in association with calling (or execution) of a service provided by the application 204. The information managed by the client processing information management table 302 is, for example, Service ID, File, Class, Method, ExecuteAt, AutoDownload, and DeviceType.

Here, the Service ID is an ID uniquely identifying a service, and the File indicates a name of a file that needs client processing execution. The Class is a name of a class that needs client processing execution, and the Method is a name of a method that needs client processing execution. The ExecuteAt indicates a timing at which client processing is executed. Here, a case that needs execution before calling a service is specified as a value "before" and a case that needs execution after calling a service is specified as a value "after". The AutoDownload indicates whether automatic download is performed from the server 100 when a file necessary for the client execution processing does not exist in the client.

The DeviceType indicates whether the client execution processing is for a network device manufactured by a vendor that provides the application 204 (manufactured by own company) (private) or for a network device manufactured by a different vendor (manufactured by another company)

(standard). A method for identifying the device type may be a method for identifying an ID that identifying a vendor.

Note that the DeviceType may just define and specify information that identifying the type of a device to be serviced for each service so that the client side module can perform processing. Therefore, a plurality of pieces of information (conditions) that identifies the device such as the DeviceType is assumed to be set. In that case, product categories of the device such as a printer, a scanner, a smart phone, a digital camera, and a car navigation system, as an ID of the DeviceType, other than the information of a vendor. In addition, model information that is defined by a vendor of the network device can be set as an ID of the DeviceType. Other than the above, information that identifies a platform such as an OS operated in the network device can be set as an ID of the DeviceType.

A firmware management table 303 is a table that manages information of firmware provided in a firmware management service. The information managed by the firmware management table 303 is, for example, Firmware ID, Product ID, Firmware Version, and File. Here, the Firmware ID is an ID that uniquely identifies firmware. The Product ID is an ID that uniquely indicates a type of product of the device such as the network printer 140 to which the firmware is applicable. The Firmware Version is information indicating a version of firmware, and the File indicates a file name of the firmware.

A report management table 304 is a table that manages information of a report provided in a reporting service. The information managed by the report management table 304 is, for example, Report ID, File, and CreatedOn. Here, the Report ID is an ID that uniquely identifies a report, the File indicates a file name of the report, and the CreatedOn indicates information of report creation date and time.

Next, a software configuration of the client 120 will be illustrated. Note that each module that constitutes the client 120 is a program module existing as a file stored in the ROM 103 or the external memory 106. Each module is loaded into the RAM 102 and executed by the OS or by a module that uses the module at execution.

A network module 220 performs network communication with the server 100 and the network printer 140. The network module 220 includes a TCP/IP module 221 and an HTTP module 222. The TCP/IP module 221 performs network communication by a TCP/IP protocol. The HTTP module 222 uses a TCP as a transport protocol, and performs network communication by the HTTP protocol.

The application 223 manages the network printer 140, and calls a service from the application 204 on the server 100. The operation control information management module 224 performs overall operation control information related-processing. An example of the application 223 includes a management application that searches for a network printer existing on a network, displays device information thereof, and manages status information. Other than the above, the present invention is applicable to any application as long as the application can expand a function by adding a module that executes a service provided by the server. To be specific, a general web browser may be employed.

The operation control information management module 224 accesses the application 204 on the server 100 through the network module 220, and acquires tag information for operation control information registration from the acquired HTML data and registers the information. In addition, the operation control information management module 224 sets data specified by the user to the operation control information, when the user requests an operation to a service, and displays a UI so that the user can select the service that has been registered as the operation control information regarding the operation. When the user selects the service, the operation control information management module 224 performs calling processing of the service selected by the user using the set data in the operation control information.

The reporting module 225 is a module for executing necessary processing on the client side in association with execution of a reporting service provided by the application 204 on the server 100. The reporting module 225 acquires print history information through a print processing module 241 of the network printer 140 as pre-processing before the execution of a reporting service. In addition, the reporting module 225 also acquires the configuration information through a device information management module 242 of the network printer 140 described below as pre-processing before the execution of a reporting service.

The firmware management module 226 is a module for executing necessary processing on the client side in association with execution of a firmware management service provided by the application 204 on the server 100. The firmware management module 226 acquires the configuration information through the device information management module 242 of the network printer 140 as pre-processing before the execution of a firmware management service, and enables a firmware update function through a network. In addition, the firmware management module 226 transmits firmware to the device information management module 242 of the network printer 140 described below and requests firmware update as post-processing after the execution of a firmware management service.

The AutoDownload module 227 downloads a module file necessary for executing processing on the client side through the AutoDownload module 207 on the server 100. The web browser 228 transmits an HTTP request message through the network module 220, and receives an HTTP response message and displays the message. An access from the client 120 to the server 100 is performed through the web browser 228.

Note that the application 204 and the application 223 have been configured to provide a plurality of services such as reporting and firmware management. Here, the present exemplary embodiment can be realized when each service is provided, and a plurality of applications having an operation control information management module is operated. In addition, the operation control information management module is incorporated in a platform such as an OS, in which an application operates, and each module of the application and the OS are in cooperation with each other, so that the present invention can be realized.

Then, a software configuration of the network printer 140 will be illustrated. In the network printer 140, various modules exist as files stored in the ROM 144 or the external memory 150, and are loaded into the RAM 143 and executed at execution.

A network module 240 performs network communication with the client 120 using an arbitrary communication protocol. The print processing module 241 receives/controls a print job transmitted from the client 120 and performs print processing. In addition, the print processing module 241 manages each history of a print job, which is an object to be processed, as print history information, and returns the history in response to a request from the reporting module 225 of the client 120. The device information management module 242 manages configuration information such as product type information, an IP address, installation location information, and firmware version information of the network printer 140. In addition, the device information management module 242 returns the configuration information in response to a request from the reporting module 225 of the client 120. Further, the device information management module 242 also manages firmware of the network printer 140. When having received a firmware distribution instruction from the firmware management module 226 on the client 120 through the network module 240, the device information management module 242 updates the own firmware by the received firmware. In addition, the device information management module 242 enables the firmware update function through a network of the own device in response to the firmware management module 226 of the client 120.

Operations of the server 100 and the client 120 when the client 120 accesses the server 100 and performs registration processing of operation control information will be descried with reference to the flowchart illustrated in FIG. 4.

In step S400, the operation control information management module 224 of the client 120 transmits a registration request of the operation control information to the operation control information management module 208 of the server 100. In step S401, the operation control information management module 208 of the server 100 receives the registration request of the operation control information transmitted from the client 120. In step S402, the operation control information management module 208 acquires the operation control information from the operation control information management table 301 of the DB module 209. In step S403, the operation control information management module 208 determines whether there is processing to be executed by the client (client execution processing) when calling a service regarding the operation control information based on the information stored in the client processing information management table 302 of the DB module 209. When there is client execution processing (Yes in step S403), the processing proceeds to step S404. Otherwise (No in step S403), the processing proceeds to step S405. In step S404, the operation control information management module 208 acquires processing information regarding the client execution processing from the client processing information management table 302 of the DB module 209.

In step S405, the operation control information management module 208 generates HTML data to be returned to the client 120. At that time, the operation control information management module 208 declares the operation control information acquired in step S402 as tag information. Further, when having acquired the client execution processing information in step S404, the operation control information management module 208 also declares the information in a format interpretable by the operation control information management module 224 of the client 120. In step S406, the operation control information management module 208 of the server 100 transmits the HTML data generated in step S405 to the operation control information management module 224 of the client 120.

FIG. 5 illustrates an example of HTML data generated by the operation control information management module 208 in step S405. Apparently, the description illustrated in FIG. 5 is an example based on a description rule of web intents, and the operation control information and the client execution processing information may be described in other formats/descriptions.

HTML data 500 illustrates an example of HTML data in which the operation control information corresponding to the firmware management service and the processing information regarding processing to be executed by the client are described.

HTML data 501 is operation control information of the firmware management service indicating that it is to receive data in an extensible markup language (XML) format as a parameter, and it is possible to display a service page in any inline display such as new Window or Picker. HTML data 502 to 504 indicate processing information to be executed by the client. HTML data 502 indicates that execution of acquisition processing of the network printer 140 is necessary as pre-processing in calling a firmware management service. HTML data 503 indicates that execution of processing of enabling the firmware update function through the network of the network printer 140 is necessary as a pre-processing in calling a firmware management service. HTML data 504 indicates that execution of distribution processing of firmware to the network printer 140 is necessary on the client side as post-processing in calling a firmware management service.

HTML data 510 is an example of HTML data in which operation control information corresponding to a reporting service and processing information regarding processing to be executed by the client are described.

HTML data 511 is operation control information of the reporting service, and indicates that it is to receive data in an XML format as a parameter, and it is possible to display a service page in any inline display such as new window or picker. HTML data 512 to 513 indicate processing information regarding processing to be executed by the client. The HTML data 512 indicates that processing of acquiring print history information and configuration information from the network printer 140 manufactured by the same vendor as the provider of the service, which is an object to be managed by the client, is necessary, as pre-processing in calling a reporting service. The HTML data S13 indicates that processing of acquiring print history information and configuration information from the network printer 140 manufactured by a different vendor from the provider of the service, which is an object to be managed by the client, is necessary, as pre-processing in calling a reporting service.

Note that there is a case in which reporting about a device manufactured by a different vendor from the provider of the service cannot be performed depending on a provided reporting service. Therefore, in the HTML data generated in step S405, a plurality of processing information regarding the processing to be executed by the client may exist, only a piece of such processing information may exist, or no such processing information may exist.

In step S407, the operation control information management module 224 of the client 120 receives the HTML data transmitted from the server 100. In step S408, the operation control information management module 224 acquires the operation control information and the client execution processing information in the tag information from the received HTML data in step S407. In step S409, the operation control information management module 224 registers the operation control information in association with the client execution processing information, and completes the processing.

The user can select a service provided by the web application at the server side from the application 223 and execute the service according to the registration processing of the operation control information here.

Figure 6A:
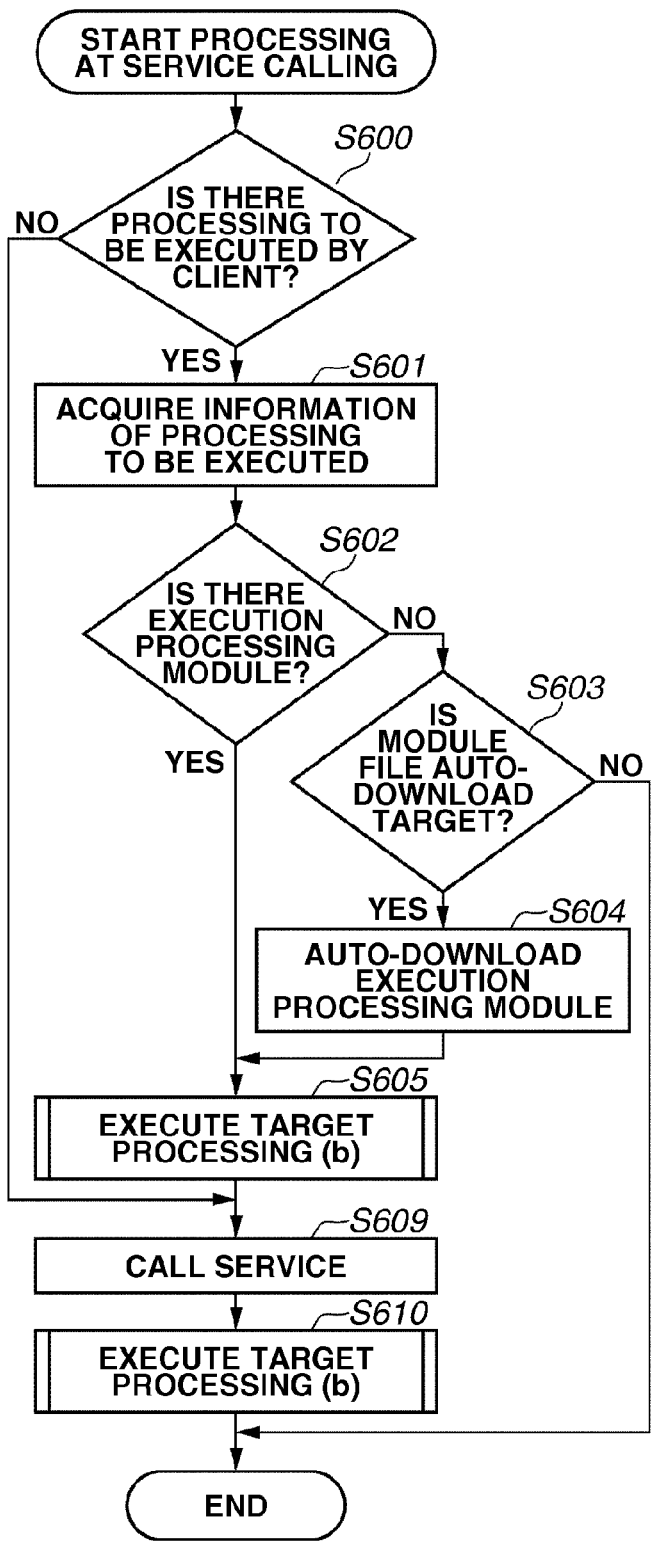
FIGS. 6A and 6B are diagrams illustrating flowcharts for describing processing of the client at calling a service in the first exemplary embodiment.

An operation in the client 120 in calling of a service of the server 100 by the client 120 will be described with reference to the flowcharts illustrated in FIGS. 6A and 6B. The processing is executed by the application 223 when a service is selected, which is corresponding to the operation control information having been already registered by the user on the UI screen of the client 120.

FIGS. 7A and 7B illustrate examples of screens on which the user selects a service on the client 120. A screen on which the user selects the service is displayed, as illustrated in FIG. 7A. All of the network printers 140 managed by the application 223 may be able to be selected as object network printers of the service. Alternatively, as illustrated in FIG. 7B, the user may select an object network printer of the service from among the network printers 140 managed by the application 223 of the client 120. In that case, a screen transition will be given in which an applicable service is to be selected on the next screen with respect to the selected network printer 140.

In step S600, the operation control information management module 224 of the client 120 determines whether there is processing to be executed by the client based on the operation control information registered about the service selected by the user. When execution of processing is necessary by the client (Yes in step S600), the processing proceeds to step S601, and when execution of processing is not necessary (No in step S600), the processing proceeds to step S609.

In step S601, the operation control information management module 224 acquires processing information regarding processing to be executed by the client from the registered operation control information. In step S602, the operation control information management module 224 checks whether there is a module file necessary for the processing to be executed by the client in the application 223. For example, in a case of a firmware management service, the operation control information management module 224 checks whether there is the firmware management module 226. For another example, in a case of a reporting service, the operation control information management module 224 checks whether there is the reporting module 225. When there is the module file (Yes in step S602), target processing (FIG. 6B) is executed in step S605. When there is no module file (No in step S602), in step S603, the operation control information management module 224 determines whether the module file is an target file of AutoDownload based on the processing information acquired in step S601. When the module file is the target file of AutoDownload (Yes in step S603), the processing proceeds to step S604. When the module file is not the target file of AutoDownload (No in step S603), the client processing cannot be executed, and thus the processing is terminated after an error message is output as needed. In step S604, the operation control information management module 224 requests AutoDownload processing of the module file necessary for the AutoDownload module 227 to the server 100. When AutoDownload of the necessary module file is completed, the processing proceeds to step S605 (FIG. 6B).

Figure 6B:
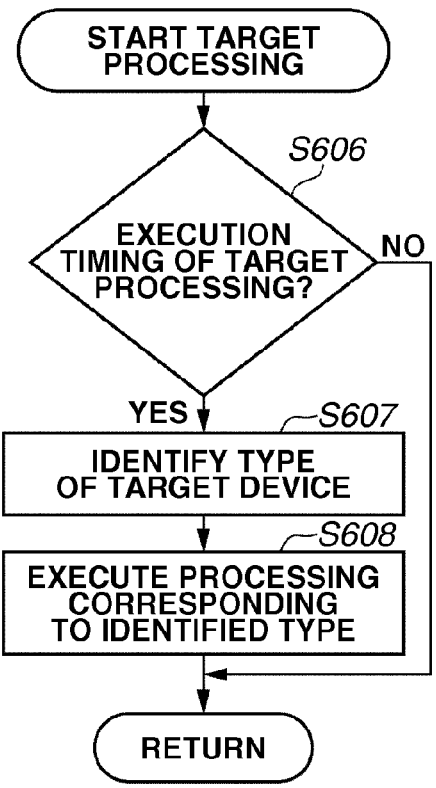

In FIG. 6B, first, in step S606, the operation control information management module 224 determines an execution timing based on the processing information acquired in step S601. When the processing is executed at the timing of S605 in FIG. 6A, whether there is processing information, execution of which is necessary before calling a service, is determined. When there is processing to be executed before calling a service (Yes in step S606), the processing proceeds to step S607. Otherwise (No in step S606), the processing exits from the present processing (FIG. 6B) and proceeds to step S609.

In steps S607 and S608, the operation control information management module 224 performs processing with respect to all of the network devices (here, the network printers 140), which are objects to be managed by the application 223. In step S607, the operation control information management module 224 analyzes the device information of the network printer 140 and identifies the device type. To be specific, the operation control information management module 224 identifies whether the network printer 140 is a printer of the provider vendor of the service or a printer manufactured by a vendor other than the provider vendor. In step S608, the operation control information management module 224 requests each module in the application 223 to execute processing corresponding to the processing information corresponding to the type of the device. Note that, in the definition in the processing information regarding the processing to be executed by the client, when there is no difference in processing content depending on the type of the device, similar processing is executed.

For example, in a case of a firmware management service, acquisition of the configuration information of a network printer by the firmware management module 226 and enabling processing of the firmware update function through the network are executed as the processing executed before calling a service. For another example, in a case of a reporting service, acquisition processing of the device configuration information and the print history information of the network printer 140 by the reporting module 225 is executed as processing executed before calling a service. Acquisition results of the configuration information and print history information of the network printer, which are results of processing execution, are output in an XML file format or the like, for example, and are used as they are as parameters of the service calling.

Following that, in step S609, the operation control information management module 224 calls a service provided by the server 100 based on the operation control information. At this time, the service is called using the processing results in step S605 as parameters as needed. In addition, a result of the service calling is output in an XML file format or the like as needed, and is used as it is as a parameter of the processing to be executed by the client after calling the service. Then, the processing proceeds to step S610, and the processing to be executed by the client after calling the service is executed (FIG. 6B). In step S600, when there is no processing to be executed by the client based on the operation control information (No in step S600), the processing of step S610 is omitted. In FIG. 6B, processing similar to the above-described processing is executed. Here, since the processing has been executed at a timing of step S610, whether there is processing information, execution of which is necessary after calling the service, is determined, and the processing is appropriately executed. To be specific, in a case of a firmware management service, distribution processing of firmware to the network printer 140 by the firmware management module 226 is executed as the client execution processing executed after calling the service.

As described above, in calling of a service provided by a web application by late binding at runtime on the server side, by expanding operation control information like the present invention, pre/post processing on the client side can be instructed together. In addition, in the present invention, necessary processing can be executed at an appropriate timing according to the operation control information on the client side.

In a first exemplary embodiment, described above, a method has been described, which instructs client-side processing before/after calling a service by late binding at runtime by the server side, in a case a service that requires a cooperation operation by the client before/after calling the service.

In a second exemplary embodiment, a case will be described, in which processing is executed on the client side in the intervals of calling a service to a plurality of network printers 140. A firmware management service with respect to a plurality of network printers will be exemplarily described as an example of a web application that operates on a server. Apparently, the present invention may be applied to a web application other than the example given in the present exemplary embodiment.

A system configuration and a hardware configuration/a software configuration of a management system of the exemplary embodiment are similar to those of FIGS. 1 to 3 of the first exemplary embodiment. Therefore, such description is omitted. Also, operations of the server 100 and the client 120 when the client 120 accesses the server 100 and performs operation control information registration are substantially similar to those of FIG. 4 of the first exemplary embodiment. Therefore, such description is omitted.

Figure 8:
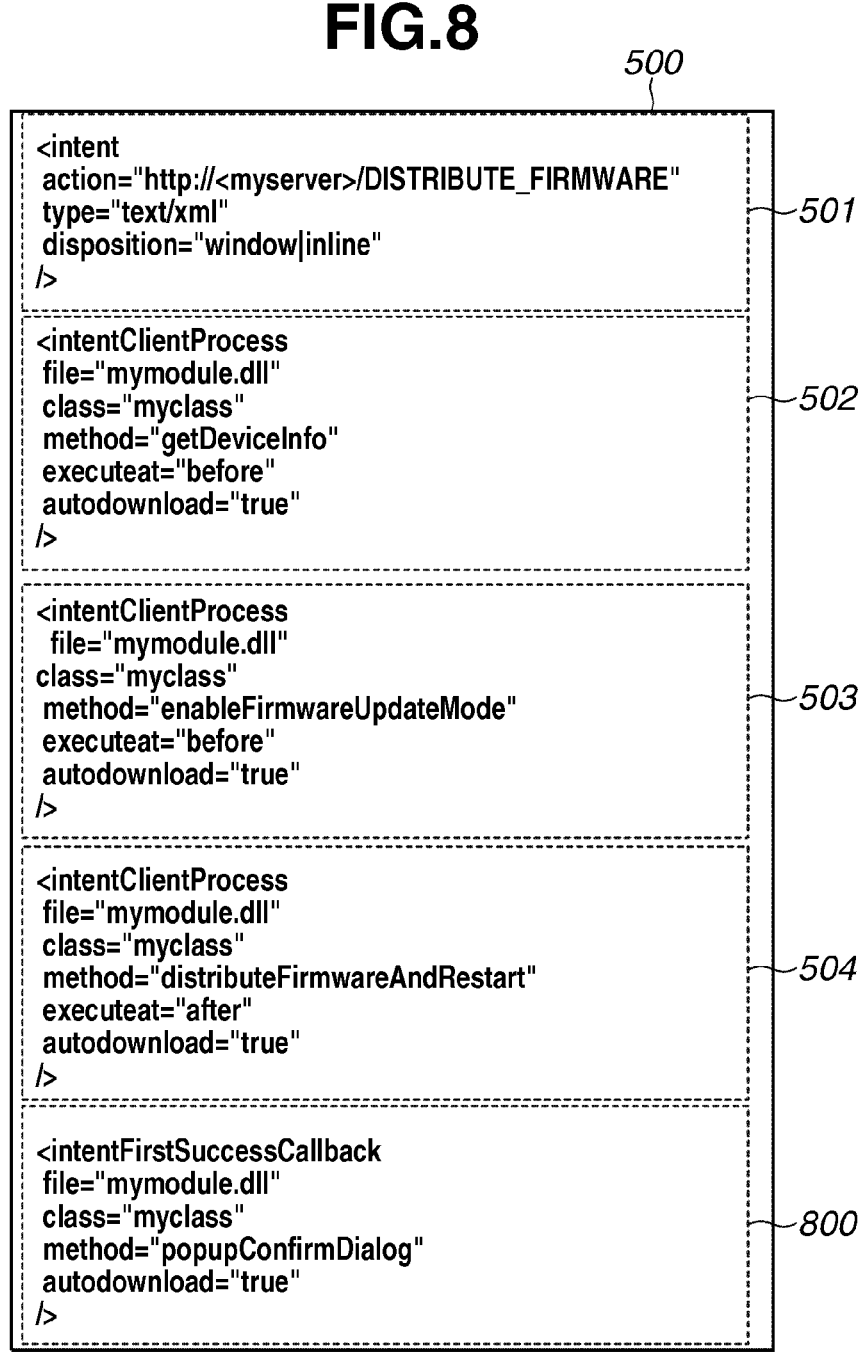
FIG. 8 is an example of HTML data in a second exemplary embodiment.

FIG. 8 illustrates an example of HTML data generated by the operation control information management module 208 in step S405 of FIG. 4 in the second exemplary embodiment. The description illustrated in FIG. 8 is an example based on a description rule of web intents, and the HTML data may be described in other formats/description. Note that HTML data 500 to 504 of FIG. 8 are similar to those of FIG. 5, and therefore, such description is omitted.

Client execution processing 800 is called after completion of client execution processing after first calling and calling, in calling of a service to the plurality of network printers 140. In the present exemplary embodiment, an example will be described, in which a screen is displayed for asking the user to confirm whether to perform continuous processing with respect to the remaining network printers 140 after a firmware management service is called to a first network printer 140 and firmware is distributed.

Figure 9:
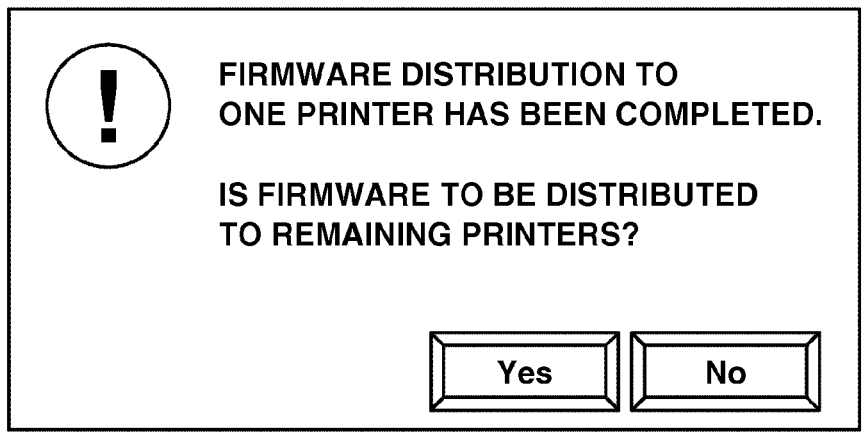
FIG. 9 is an example of a pop-up screen displayed after first calling of a service in the second exemplary embodiment.

FIG. 9 illustrates an example of a pop-up dialogue displayed on a UI of the client 120 that requests the user to confirm continuation of processing, as a result of execution of the client execution processing 800.

An operation of the client 120 when the client 120 calls a service of the server 100 will be described with reference to the flowcharts illustrated in FIGS. 10A and 10B. Note that, here, description of processing similar to step S600 to step S605, and step S609 illustrated in FIG. 6A, and of processing similar to step S606 to step S608 illustrated in FIG. 6B are omitted.

In step S605, when the processing before calling the service is completed, the processing proceeds to the processing of service calling of step S1000 (FIG. 10B). The present processing is executed with respect to a network service (here, a network printer 140) to be managed, which is a target of the service.

In step S1001, the operation control information management module 224 calls a service provided by the server 100 based on the operation control information using the client execution result as a parameter. The service calling result is output in an XML file format, for example, and is used as it is as a parameter of the client execution processing after calling a service.

Following that, in step S1002, the operation control information management module 224 executes the above-described processing illustrated in FIG. 6B. To be specific, the operation control information management module 224 executes the processing after calling the service as needed based on the processing information. In the present exemplary embodiment, the operation control information management module 224 requests the firmware management module 226 to execute processing, and displays a UI indicated by the pop-up dialogue of FIG. 9, requesting the user to confirm continuation of processing.

In step S1003, the operation control information management module 224 determines whether to continue the processing based on an input through the pop-up dialogue of FIG. 9. When the user selects a Yes button through the pop-up dialogue UI of FIG. 9 (Yes in step S1003), the processing proceeds to Yes at the branch in step S1003, and proceeds to the next processing about the network printer. When the user selects a No button through the pop-up dialogue UI of FIG. 9 (No in step S1003), the processing proceeds to No at the branch in step S1003, and does not continue processing and terminates the present processing (FIG. 10B).

Note that, in step S1002, when there is no processing to be executed after calling the service, the processing omits processing in step S1003, returns to step S1001, and repeats the processing until performing processing with respect to all network printers.

With the above processing, even in a case where the processing is executed on the client side in the intervals of calling a service to a plurality of network printers 140, the server side can instruct the client-side processing by the late binding at runtime. Especially, a user's input to interrupt the processing becomes possible when processing is performed with respect to a plurality of management devices before/after calling a service.

Note that a system including an appropriate combination of the above-described exemplary embodiments and a function of the system are included in the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-015872 filed Jan. 30, 2013, which is hereby incorporated by reference herein in its entirety.

What is claimed is:

1. A client configured to perform communication with a server, comprising:
  a memory; and
  a processor in communication with the memory, the processor configured to control:
  a request unit configured to access a service provided by the server and to request operation control information corresponding to the service;
  a registration unit configured to execute registration processing of the operation control information received from the server according to the request, wherein the operation control information includes at least action information indicating an operation executed by the service and type information indicating information for filtering associated with the operation;
  a calling unit configured to call the service in order to cause the server to execute the service according to selection of the service corresponding to the operation control information registered by a user; and
  an execution unit configured to execute processing according to a content of processing information;
  wherein the registration unit is further configured to register client processing information in associated with the operation control information if operation control information and the client processing information are received from the server, and
  wherein the execution unit is configured to executed, in calling the service by the calling unit, processing to be executed by the client according to t a content of the registered client processing information associated with the operation control information.

2. The client according to claim 1, wherein the registration unit is provided as a function of a web browser executed by the client.

3. The client according to claim 2, wherein the client passes a result of the processing executed by the execution unit to the server for the service to be called.

4. The client according to claim 1, wherein the execution unit executes the processing to be executed by the client before calling the service according to the selection by the user.

5. The client according to claim 1, wherein the execution unit executes the processing to be executed by the client after execution of the called service according to the selection by the user.

6. The client according to claim 1, wherein the execution unit executes the processing to be executed by the client in an interval of the called service according to the selection by the user.

7. The client according to claim 1, wherein the service includes at least any of a firmware management service, a reporting service, an application distribution service, a resource distribution service, an address book distribution service, and a print service.

8. The client according to claim 1, wherein the processing to be executed by the client by the execution unit includes at least any of (a) processing of acquiring device information, (b) processing of acquiring status information, (c) processing of acquiring print history information, (d) processing of acquiring firmware information, (e) processing of distributing firmware, and (f) processing of inquiring whether to continue the service, with respect to a device connected to the client through a network.

9. The client according to claim 8, wherein the information for identifying the device includes at least any of information for identifying a vendor, information for identifying a product category, information for identifying a model, and information for identifying a platform that operates in the device.

10. The client according to claim 1, wherein, in the client processing information, information for identifying a device serving as a target of processing to be executed by the client in calling of the service is specified, and wherein the execution unit executes the processing to be executed by the client in calling of the service with respect to a device corresponding to the information for identifying the device serving as the target from among devices connected to the client through a network.

11. A management system including a client and a server, wherein the client comprises:
  a request unit configured to access a service provided by the server and to request operation control information corresponding to the service;
  a registration unit configured to execute registration processing of the operation control information received from the server according to the request, as a function of a web browser executed by the client, wherein the operation control information includes at least action information indicating an operation executed by the service and type information indicating information for filtering associated with the operation;
  a calling unit configured to call the service in order to cause the server to execute the service according to selection of the service corresponding to the operation control information registered by a user; and
  an execution unit configured to execute processing according to a content of processing information,
  wherein the registration unit is further configured to register client processing information in association with the operation control information if the operation control information and the client processing information are received from the server,
  wherein the execution unit is configured to execute, in calling of the service by the calling unit, processing to be executed by the client according to a content of the registered client processing information associated with the operation control information, and
  wherein the server comprises: a transmission unit configured to transmit data including the operation control information to the client in order to register the operation control information corresponding to a service to be provided to the client in the web browser according to the request from the client; and an execution unit configured to execute the service according to calling of the service from the client using the operation control information, wherein, in the operation control information, the processing to be executed by the client in calling of the service is specified.

12. The management system according to claim 11, wherein, in calling of the service from the client, when the execution unit has been passed a result of the processing to be executed by the client indicated by the corresponding operation control information, the execution unit executes the service according to the result.

13. The management system according to claim 11, wherein, in the operation control information, information for identifying a device serving as a target of processing to be executed by the client in calling of the service is specified.

14. The management system according to claim 13, wherein the information for identifying the device includes at least any of information for identifying a vendor, information for identifying a product category, information for identifying a model, and information for identifying a platform that operates in the device.

15. A method in a client configured to perform communication with a server, the method comprising:
    accessing a service provided by the server and requesting operation control information corresponding to the service;
    executing registration processing of the operation control information received from the server according to the request, wherein the operation control information includes at least action information indicating an operation executed by the service and type information indicating information for filtering associated with the operation;
    calling the service in order to cause the server to execute the service according to selection of the service corresponding to the operation control information registered by a user; and
    executing processing according to a content of processing information,
    registering client processing information in association with the operation control information if the operation control information and the client processing information are received from the server, and
    executing, in calling the service, processing to be executed by the client according to a content of the registered client processing information associated with the operation control information.

16. The method according to claim 15, wherein the registration processing is provided as a function of a web browser executed by the client.

17. The method according to claim 15, wherein the processing to be executed by the client is executed before calling of the service according to the selection by the user.

18. The method according to claim 15, wherein the processing to be executed by the client is executed after execution of the called service according to the selection by the user.

19. The method according to claim 15, wherein the processing to be executed by the client is executed in an interval of the called service according to the selection by the user.

20. A method in a management system including a client and a server, the method comprising:
    at the client:
    accessing a service provided by the server and requesting operation control information corresponding to the service;
    executing registration processing of the operation control information received from the server according to the request, as a function of a web browser executed by the client, wherein the operation control information includes at least action information indicating an operation executed by the service and type information indicating information for filtering associated with the operation;
    calling the service in order to cause the server to execute the service according to selection of the service corresponding to the registered operation control information by a user, and
    executing processing according to a content of processing information,
    registering client processing information in association with the operation control information if the operation control information and the client processing information are received from the server, and
    executing, in calling the service, processing to be executed by the client according to a content of the registered client processing information associated with the operation control information, and
    at the server:
    transmitting data including the operation control information to the client in order to register the operation control information corresponding to a service to be provided to the client in the web browser according to the request from the client; and
    executing the service according to calling of the service from the client using the operation control information, wherein, in the operation control information, the processing to be executed by the client in calling of the service is specified.

21. The method according to claim 20, wherein, in calling of the service from the client, when the server has been passed a result of the processing to be executed by the client indicated by the corresponding operation control information, the server executes the service according to the result.

22. The method according to claim 20, wherein, in the operation control information, information for identifying a device serving as a target of processing to be executed by the client in calling of the service is specified.

23. The method according to claim 22, wherein the information for identifying the device includes at least any of information for identifying a vendor, information for identifying a product category, information for identifying a model, and information for identifying a platform that operates in the device.

24. A computer readable storage medium on which is stored a computer program for making a computer execute a method for a client, the method comprising the steps of:
    accessing a service provided by a server and requesting operation control information corresponding to the service;
    executing registration processing of the operation control information received from the server according to the request, wherein the operation control information includes at least action information indicating an operation executed by the service and type information indicating information for filtering associated with the operation;
    calling the service in order to cause the server to execute the service according to selection of the service corresponding to the operation control information registered by a user; and
    executing processing to be executed by the client according to a content of processing information,
    registering client processing information in association with the operation control information if the operation control information and the client processing information are received from the server,
    executing, in calling of the service, according to a content of the registered processing information associated with the operation control information.

* * * * *